July 16, 1929.   R. SCHWEICH   1,720,971
SPUR GEAR SPEED INCREASING AND SPEED REDUCING STANDARD
DEVICE IN WHICH THE DISTANCE BETWEEN CENTERS
AND THE GEAR RATIO ARE VARIABLE
Filed Sept. 30, 1927   2 Sheets-Sheet 1

R. Schweich
INVENTOR

By Marks & Clerk
Attys.

Patented July 16, 1929.

1,720,971

UNITED STATES PATENT OFFICE.

ROGER SCHWEICH, OF PARIS, FRANCE, ASSIGNOR TO SOCIETE ANONYME DES ENGRENAGES CITROEN, OF PARIS, FRANCE.

SPUR-GEAR SPEED-INCREASING AND SPEED-REDUCING STANDARD DEVICE IN WHICH THE DISTANCE BETWEEN CENTERS AND THE GEAR RATIO ARE VARIABLE.

Application filed September 30, 1927, Serial No. 223,219, and in France April 30, 1927.

My invention relates to improvements in change-speed devices with variable gear ratio and distance between centers, and more particularly refers to a speed increasing and reducing device comprising two sets of spur gearing, mounted in suitable casings, whose arrangement is such that I am enabled to obtain a wide range for the increase or reduction of speed, and the apparatus is further adapted with great facility to the conditions of standard and large scale manufacture.

In my said apparatus, the desired ratio for speed increase or reduction is divided between two pairs of spur gearing, of which the first may be termed the slow speed pair and is supported in a main casing which forms the general frame of the apparatus, and the second, designated as the high speed pair, is supported in an auxiliary casing which is secured to the side of the first-mentioned casing.

The power transmission shafts for the medium and the slow speed carry the gearing of the slow speed pair and are mounted in two slots which are either vertical or inclined, or one may be vertical and the other inclined, said slots being formed in the sides of the main casing; the said shafts are so disposed that their relative positions in their respective slots may be varied, while at the same time providing fluidtight conditions for the casing and its cover.

In addition to the medium speed and slow speed shafts I employ a high speed shaft carrying a pinion which engages a gear wheel mounted in the overhung position upon the medium speed shaft at the exterior of the main casing; the said pinion and gear wheel constitute the high speed pair and are mounted in the auxiliary casing.

The shafts of the said apparatus are in all cases mounted in ball bearings, and the latter are disposed in suitable boxes secured to bosses corresponding to the slots of the main casing employed for the medium and slow speed shafts. The ball bearings of the high speed shaft are disposed in boxes which are cast in one piece and are mounted on the main casing upon the boss pertaining to the medium speed shaft, at the side of the box containing the ball bearing of said shaft which is placed on the side under consideration. This particular method of mounting of the high speed shaft, and the overhung disposition of the gear wheel of the slow speed pair mounted on the high speed shaft, are essential characteristics of the invention, and by their use the general size of the apparatus can be much reduced without excessive stresses upon the ball bearings.

Special dispositions are further employed to provide fluidtight joints at the places where the shafts extend out of the corresponding casings.

With the said apparatus I am enabled to obtain all the gear ratios comprised between 3 and 30. Furthermore, the apparatus is well adapted for standard and large scale manufacture, since I thus simplify to the maximum degree the trimming of the main and the auxiliary casings, by eliminating the marking out and the boring, as will be further specified.

The following description with reference to the appended drawings show by way of example an embodiment of my invention.

Figure 1:
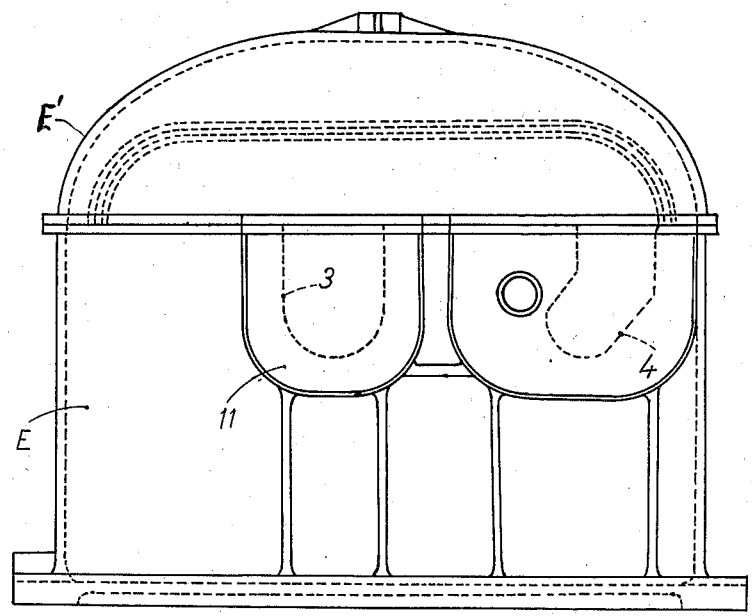
Fig. 1 is a front view of the main casing and of the auxiliary casing of the change-speed device which are supposed to be suitably mounted.
Figure 2:
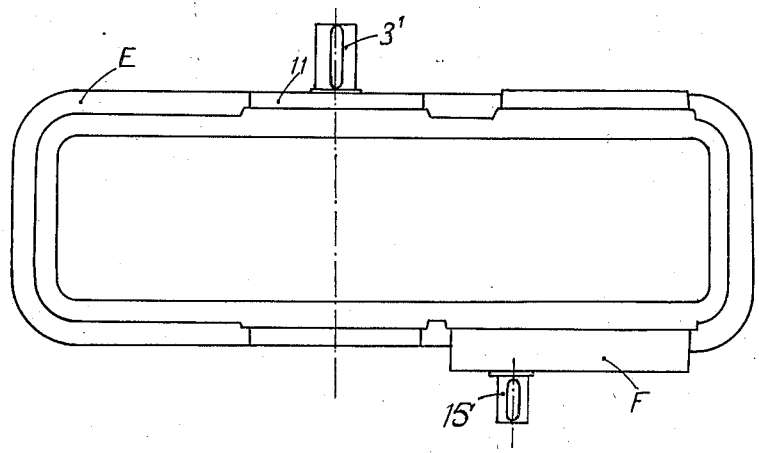
Fig. 2 is a plan view of the change-speed apparatus.
Figure 3:
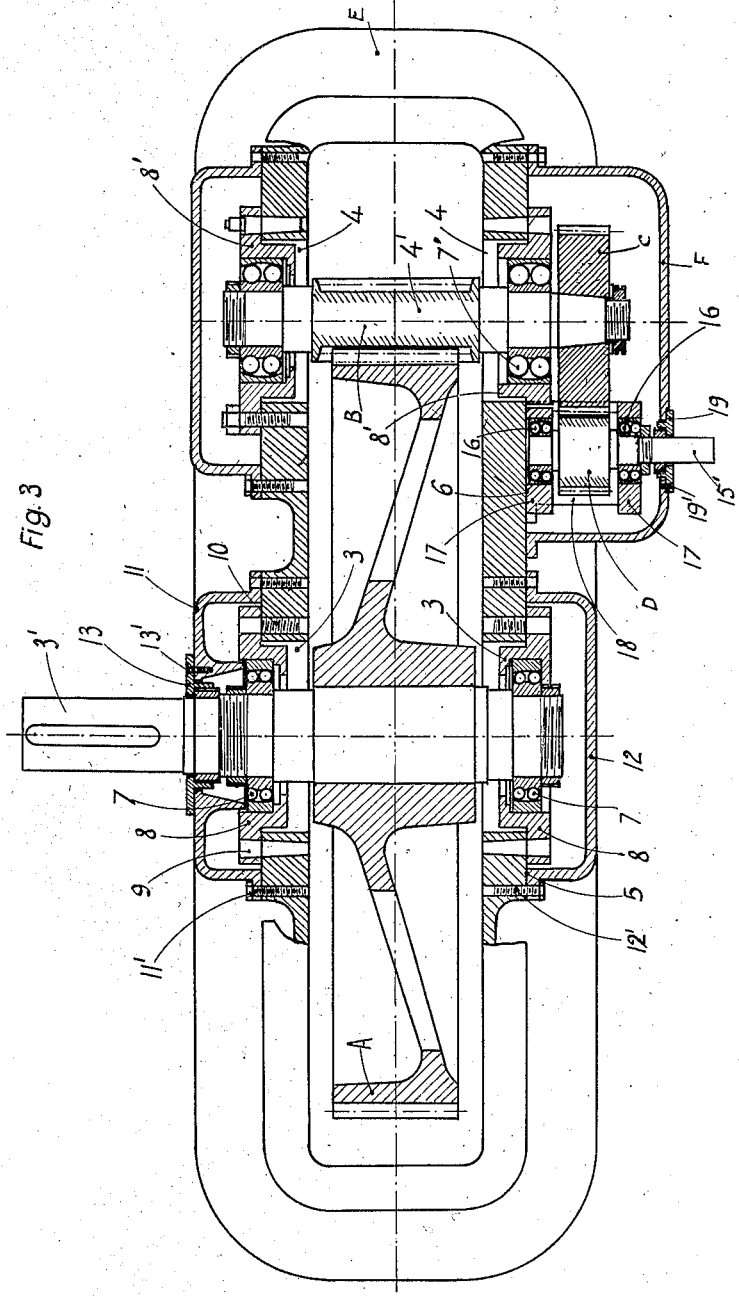
Fig. 3 is a corresponding plan view, partly in section, with a portion of the top of the apparatus broken away.

As shown in the drawings, E is the main casing in whose sides are formed the two slots which may be vertical 3 or inclined 4, or one slot 3 may be vertical and the other slot 4 inclined, in which are respectively disposed the shaft 3' for the slow speed and the shaft 4' for the medium speed. Upon one end of the medium speed shaft 4' which extends outwardly of the side of the first casing, is mounted by a special device the wheel C of a pair of high speed gears. The slow speed shaft 3' and the medium speed shaft 4' are mounted in such manner that their relative positions in their respective slots 3 and 4 can be varied. The distance between centers of the slow speed and medium speed shafts may thus be changed, by placing the shaft corresponding to the inclined slots at a greater or less height in the interior of said slots. If desired, the vertical slots may be given a sufficient width to allow the center of the corresponding shaft to be moved upon a horizontal line.

Since the distance between centers of the slow speed gears is variable, the main casings E can be manufactured to standard size, inasmuch as they may be employed for a wide range of distances between centers and different ratios for the said slow speed gears. The trimming is reduced to the simultaneous planing of the two bosses 5 and 6 which support the bearings of the shafts 3' and 4', so as to place them in the same plane on either side of the casing and to make these planes parallel. Upon the trimmed surface of one boss is disposed the trimmed supporting surface of the auxiliary casing F which contains the high speed gears C and D. The trimming of the said contact surfaces thus provides for a fluidtight mounting of the second casing upon the first, by means of the bolts 12'

The high speed shaft 3' and the medium speed shaft 4' are provided with the respective ball bearings 7 and 7' which are mounted in the respective one-piece cast iron boxes 8 and 8' which are secured to the outer parts of the bosses by the tapered pins 9 and the bolts 10.

The box 8 for the slow speed shaft and the box 8' containing the bearing of the medium speed shaft situated opposite the second casing F have the same shape, or this differs but slightly. The box 8' for the medium speed shaft which is situated adjacent the second casing F is secured in such manner as to allow the lateral addition of a cast iron member 18 which is secured to the sides of the casing E upon the boss 6 and maintains the two boxes 17 of the bearings 16 employed for the high speed shaft 15'; said member 18 is secured to the boss of the first casing by tapered pins and by bolts, and its position with reference to the box 8' of the medium speed shaft can be adjusted so as to vary the distance between centers of the high speed shaft C—D.

This pair of gears comprises firstly a pinion D, keyed to the high speed shaft 15' which is mounted in two ball bearings 16 contained in the two boxes 17 of the single piece 18, and secondly a gear wheel C which is keyed in the overhung position on the end of the medium speed shaft 4'.

Due to the arrangement adopted for the speed reducing device, this overhung position of the wheel C will not cause an excessive stress upon the bearing 7' of the medium speed shaft 4' situated adjacent the auxiliary casing F. The stresses tangent to the pitch circles of the high speed and the slow speed gears will produce contrary reactions on the bearing 7', so that the load upon this bearing will be less than what it would be without the use of the gear wheel C of the high speed set, and will hence be placed under very favorable operating conditions. For this reason it is unnecessary to employ a third bearing upon the outer wall of the auxiliary casing F, and I thus simplify the construction and reduce the general size in the direction of the width, by eliminating the third bearing, and also due to the fact that the size of the bearing 7' need not be increased.

It should be noted that while the size of the auxiliary casing in the lateral direction is already much reduced due to the simple manner in which it is secured to the main casing E, this size can be further reduced by the use of herringbone gear wheels whereby the efforts can be transmitted with a less width of teeth than with other gears.

The gear wheel C of the high speed pair is mounted on the end of the medium speed shaft 4' by means of a tapered bore whose vertex is situated on the side opposite the main casing E, and herein the wheel can be removed without taking off the boxes 8' of the medium speed shaft 4'.

The main casing is made fluidtight by means of the covers 11 and 12 which are bolted at 11' and 12' to the sides of the casing which correspond respectively to the slow speed shaft 3' and to one end of the medium speed shaft 4'. At the end of the medium speed shaft situated next the auxiliary casing F, the main casing E is made fluidtight by means of the casing F itself. The covers 11 and 12, which are placed at the points at which the slow speed shaft 3' and the medium speed shaft 4' do not extend from the casing, are not apertured at their surface, but the cover which is placed on the side opposite the slow speed shaft 3' is bored at the center to allow the shaft to extend out of the casing, and is provided with a small cover 13 secured by the screws 13'. The internal diameter of the latter is much smaller than the bore of the said cover, so that when erecting the apparatus the said cover may be sufficiently raised along the bosses 5 and 6 so as to make contact with the lower face of the flange of the cover E' of the casing E, whereby a tight closing is obtained.

The cover 11 comprises an annular surface at the interior which serves as an abutment for the outer race of the ball bearing 7 of the slow speed shaft 3'.

The fluidtight conditions for the casing E adjacent the slow speed shaft 3', and for the casing F adjacent the high speed shaft 15', are obtained by the respective covers 13 and 19 which are secured by the screws 13' and 19' and by castellated nuts.

The operation is as follows:—

The end of the high speed shaft 15' is connected with the engine to obtain a reduction of speed, and with the actuated machine to obtain an increase of speed, and this connection may be effected by an elastic coupling. To modify the distance between centers of the high speed and the slow speed shafts, I may vary the distance between centers of the high speed and the medium speed shafts as well as the distance between centers of the medium speed and slow speed shafts, either simultaneously or separately. It will suffice in the first case to change the position of the boxes 8 and 8' on the bosses 5 and 6 after changing the parts of the gearing and in the second case to vary the position of the member 18 with reference to the box 8'.

I claim:

1. A speed increasing and reducing apparatus adapted for standard manufacture, with variable gear ratio and distance between centers, comprising a main casing having oppositely situated slots provided in the two respective sides of said casing, bosses formed on the said casing adjacent said slots, a slow speed shaft and a medium speed shaft disposed in said slots, gear wheels mounted in said casing and secured respectively to the slow speed shaft and the medium speed shaft, a gear wheel mounted on the end of the medium speed shaft and exteriorly of the said main casing, a pinion coacting with said last mentioned gear wheel, a high speed shaft carrying said pinion, an auxiliary casing containing the said high speed shaft as well as the said pinion and said last mentioned gear wheel, and means whereby the said auxiliary casing may be secured to the boss of the main casing for the medium speed shaft.

2. A speed increasing and reducing apparatus adapted for standard manufacture, with variable gear ratio and distance between centers comprising a main casing having oppositely situated slots provided in the two respective sides of said casing, bosses formed on the said casing adjacent said slots, a slow speed shaft, a medium speed shaft, ball bearings for said shafts mounted in said slots, gear wheels secured respectively to the slow speed shaft and the medium speed shaft, a gear wheel mounted on the end of the medium speed shaft and exteriorly of the said main casing, a pinion coacting with said last mentioned gear wheel, a high speed shaft carrying the said pinion, two ball bearings supporting the said high speed shaft, a pair of members supporting the ball bearings of each shaft, means for securing one of said members to the boss of the main casing for the medium speed shaft, an auxiliary casing containing the high speed shaft together with the said member containing the ball bearings for said shaft and also the said pinion and last mentioned gear wheel, and means for securing the said auxiliary casing to the boss of the main casing to which the said member containing the bearings is secured.

3. A speed increasing and reducing apparatus adapted for standard manufacture, with variable gear ratio and distance between centers, comprising a main casing having two oppositely situated vertical slots provided in the two respective sides of said casing and two oppositely situated inclined slots provided in said sides, bosses formed on the said casing adjacent the vertical and the inclined slots, a slow speed shaft mounted in ball bearings and disposed in the said vertical slots, a medium speed shaft mounted in ball bearings and disposed in the said inclined slots, a first gear wheel keyed to the slow speed shaft, a first pinion keyed to the medium speed shaft and coacting with said gear wheel, a second gear wheel mounted on the end of the medium speed shaft and exteriorly of the said main casing, a second pinion coacting with the second gear wheel, a high speed shaft carrying the second pinion, an auxiliary casing containing the high speed shaft, the second pinion and the second gear wheel, and means for securing the said auxiliary casing to the boss of the main casing for the medium speed shaft.

4. A speed increasing and reducing apparatus adapted for standard manufacture, with variable gear ratio and distance between centers, comprising a main casing having two oppositely situated vertical slots provided in two respective sides of said casing and two oppositely situated inclined slots provided in said sides, bosses formed on the said casing adjacent the vertical and the inclined slots, a slow speed shaft mounted in ball bearings and disposed in the said vertical slots, a medium speed shaft mounted in ball bearings and disposed in the said inclined slots, a first gear wheel keyed to the slow speed shaft, a first pinion keyed to the medium speed shaft and coacting with the first gear wheel, a second gear wheel mounted on the end of the medium speed shaft and exteriorly of the main casing, a second pinion coacting with the second gear wheel, a high speed shaft carrying the second pinion, two ball bearings supporting the high speed shaft, a member supporting the ball bearings for each shaft, means for securing one of said members to the boss of the said main casing for the medium speed shaft, an auxiliary casing containing the high speed shaft together with the said member containing the ball bearings for the said high speed shaft and also the second pinion and the second gear wheel, and means for securing the said auxiliary casing to the boss of the main casing to which the said member containing the bearings is secured.

In testimony whereof I affix my signature.

ROGER SCHWEICH.